United States Patent [19]

Taylor

[11] Patent Number: 5,015,392
[45] Date of Patent: May 14, 1991

[54] THICKENER

[75] Inventor: David Taylor, New South Wales, Australia

[73] Assignee: Supaflo Pty. Limited, Australia

[21] Appl. No.: 436,720

[22] Filed: Nov. 15, 1989

[30] Foreign Application Priority Data

Nov. 17, 1988 [AU] Australia .................................. PJ1518
Apr. 24, 1989 [AU] Australia .................................. PJ3869

[51] Int. Cl.$^5$ ............................................ B01D 21/24
[52] U.S. Cl. ...................................... 210/712; 210/801; 210/127; 210/129; 210/207; 210/195.1; 210/519
[58] Field of Search ............................. 209/5, 173; 210/702, 210/709, 712, 714, 723, 732, 738, 96.1, 127, 128, 129, 194, 205, 207, 208, 242.1, 519, 195.1, 800, 801

[56] References Cited

U.S. PATENT DOCUMENTS

| 1,344,370 | 6/1920 | Allen | 210/96.1 |
| 1,452,016 | 4/1923 | Allen | 210/96.1 |
| 1,472,317 | 10/1923 | Allen | 210/96.1 |
| 2,528,094 | 10/1950 | Walker | 210/207 |
| 2,678,730 | 5/1954 | Coulter | 210/738 |
| 3,532,218 | 10/1970 | Von Blottnitz et al. | 210/519 |
| 3,926,805 | 12/1975 | Walker | 210/519 |
| 4,267,052 | 5/1981 | Chang | 210/208 |
| 4,293,416 | 10/1981 | Keoteklian | 210/208 |
| 4,357,242 | 11/1982 | Chandler | 210/207 |
| 4,541,850 | 9/1985 | Oda et al. | 210/519 |

FOREIGN PATENT DOCUMENTS 1517647  4/1969  Fed. Rep. of Germany ...... 210/208

Primary Examiner—Peter Hruskoci
Attorney, Agent, or Firm—Leydig, Voit & Mayer

[57] ABSTRACT

A thickener for liquids or pulps comprising a tank in which flocculation takes place and dilute liquid is displaced toward the top of the tank, a feedwell having a bottom opening in fluid communication with said tank, conduit means to supply feed liquid to said feedwell, and apertures in said feedwell or said conduit disposed above said bottom opening and positioned to permit the flow of said dilute liquid directly from the tank into the feed liquid for dilution thereof.

The thickener preferably comprises a weir plate assembly connected with a side wall of the feedwell adjacent a side opening therein. The weir plate is preferably moveable by means of a float assembly between an open position permitting said dilute liquid to flow from the tank to the feedwell, and a closed position substantially closing the side opening.

6 Claims, 2 Drawing Sheets

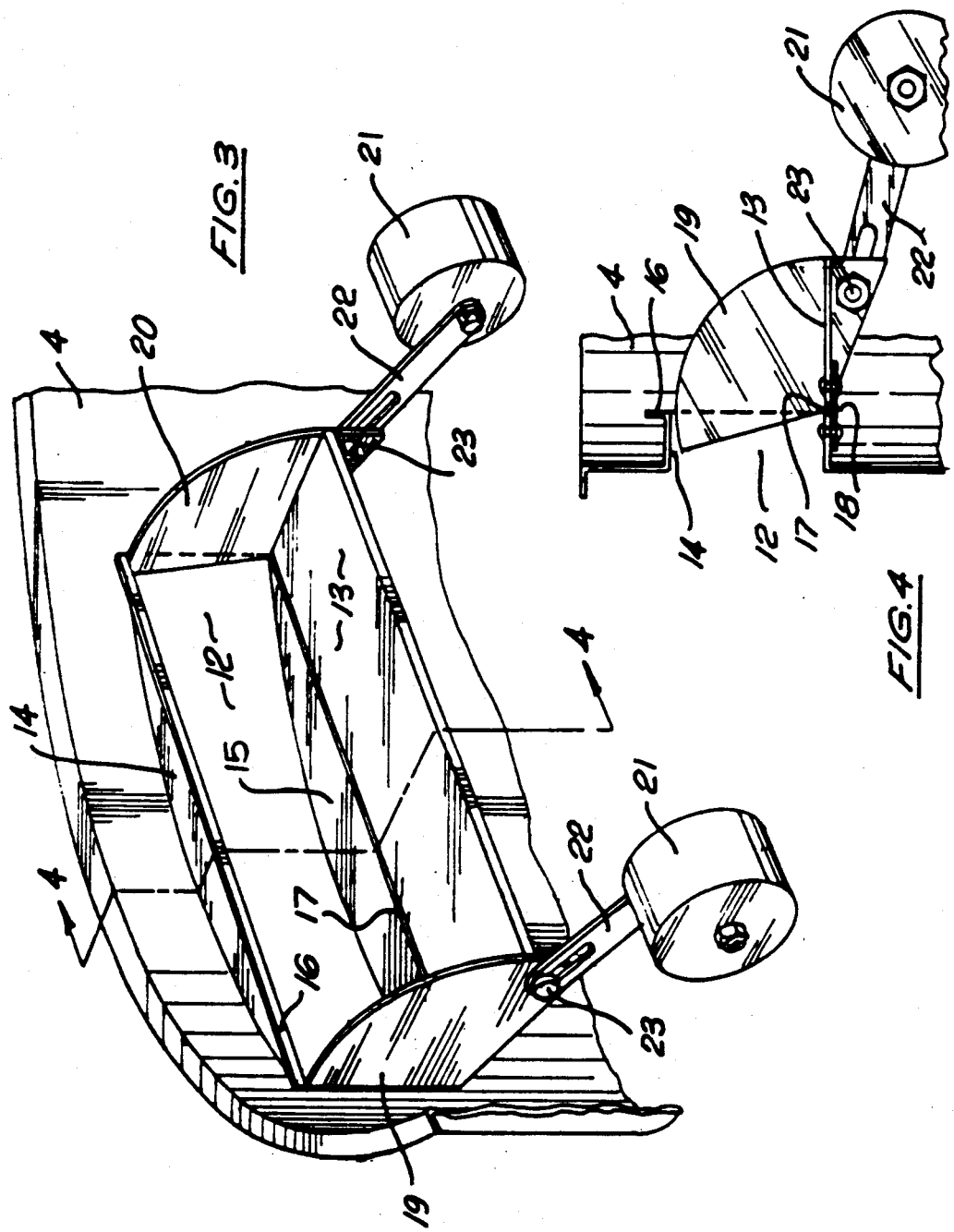

THICKENER

BACKGROUND OF THE INVENTION

This invention relates to thickeners for liquid suspensions and pulps and in particular to recycling of overflow liquor in thickeners.

In thickening certain pulps, it is sometimes necessary to first dilute the pulp in order to enable flocculation to take place when a polymer flocculant is added. This is usually achieved in thickeners by recycling some of the dilute liquid (known as "liquor") overflow from the top of the thickener tank back to the feedwell in order to dilute the inflowing pulp.

In the past, in order to recycle the overflow liquor it has been necessary to install a system of pumps, fluid lines and valves. This involves significant capital costs, and gives rise to a further problem of controlling the recycling process, which has hitherto been controlled manually.

SUMMARY OF THE INVENTION

It is an object of the present invention to provide a thickener having a system for recycling the dilute liquor overflow from the thickener tank which overcomes or at least ameliorates the above disadvantages.

Accordingly, in a first aspect, the invention is a thickener for liquids or pulps comprising a tank in which flocculation takes place and dilute liquid is displaced toward the top of the tank, a feedwell having a bottom opening in fluid communication with said tank, conduit means to supply feed liquid to said feedwell, and apertures in said feedwell or said conduit disposed above said bottom opening and positioned to permit the flow of said liquid directly from the tank into said feed liquid for dilution thereof.

The flow of dilute liquid is preferably brought about by the difference in specific gravity between the feed liquid in the feedwell and the dilute liquid in the tank, and hence the height difference between these two liquids.

However, the flow can also be brought about by a velocity induced pressure differential in a venturi section forming part of the conduit.

In one embodiment, the aperture takes the form of a side opening in the feedwell, the effective height of which is selectively adjustable by means of a plate assembly defining a lower marginal edge of the side opening.

The plate assembly preferably comprises a selectively adjustable weir plate pivotably connected to a side wall of the feedwell adjacent the side opening and movable between an open position permitting the dilute liquid to flow from the tank into the feedwell, and a closed position, substantially restricting the flow between the tank and the feedwell.

In the preferred embodiment, a weir plate incorporating side panels is pivotably connected immediately below a transverse slot in the side wall of the feedwell. In this configuration the remote upper edge of the weir plate forms the effective lower marginal edge of the side opening such that rotation of the weir plate about the axis of pivoting provides selective adjustment of the effective height of the side opening whereby the weir plate selectively and progressively establishes fluid flow between the tank and the feedwell.

In an alternative embodiment, the weir plate is mounted immediately below the side opening for vertical sliding along the side wall of the feedwell, so as to progressively cover at least the lower portion of the side opening to provide selective adjustment of the effective height of the side opening.

The weir plate is preferably controlled by means dependent upon the difference in specific gravity, and hence the difference in height, between the liquids in the thickener tank and the feedwell. In the preferred embodiment, the controlling means includes a float assembly connected with the weir plate and in contact with the liquid surface in the feedwell.

In another embodiment, the conduit comprises a perforate channel extending through the thickener tank and into the feedwell, permitting the flow of dilute liquid directly from the tank, through the apertures and into the conduit, thereby providing for dilution of the inflowing feed liquid within the channel, prior to entering into the feedwell.

According to a second aspect of the invention, there is provided a method of thickening liquids or pulps in a tank in which flocculation takes place and dilute liquid is displaced toward the top of the tank, said method comprising the steps of supplying feed liquid via conduit means to a feedwell having a bottom opening in fluid communication with the tank, and directing a selected flow of said dilute liquid from the tank through an aperture in said conduit or said feedwell into the feed liquid for dilution thereof.

BRIEF DESCRIPTION OF THE DRAWINGS

A preferred embodiment of the invention will now be described, by way of example only, with reference to the accompanying drawings in which:

FIG. 3 is a cutaway perspective view of the feedwell having a slot and weir plate according to the invention; and FIG. 4 is a cutaway side elevation of the feedwell shown in FIG. 3.

DESCRIPTION OF THE PREFERRED EMBODIMENTS

Figure 1:
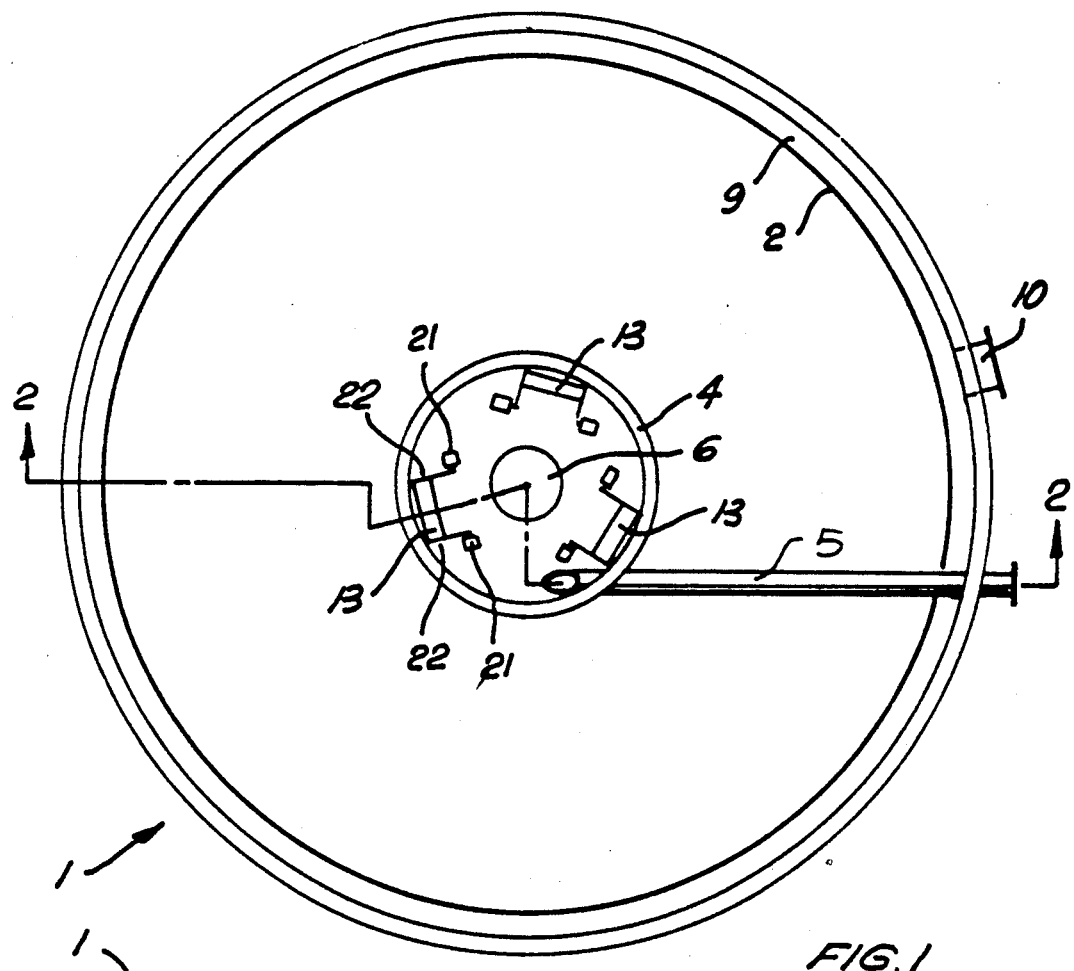
FIG. 1 is a plan view of a thickener and associated feedwell according to the invention.
Figure 2:
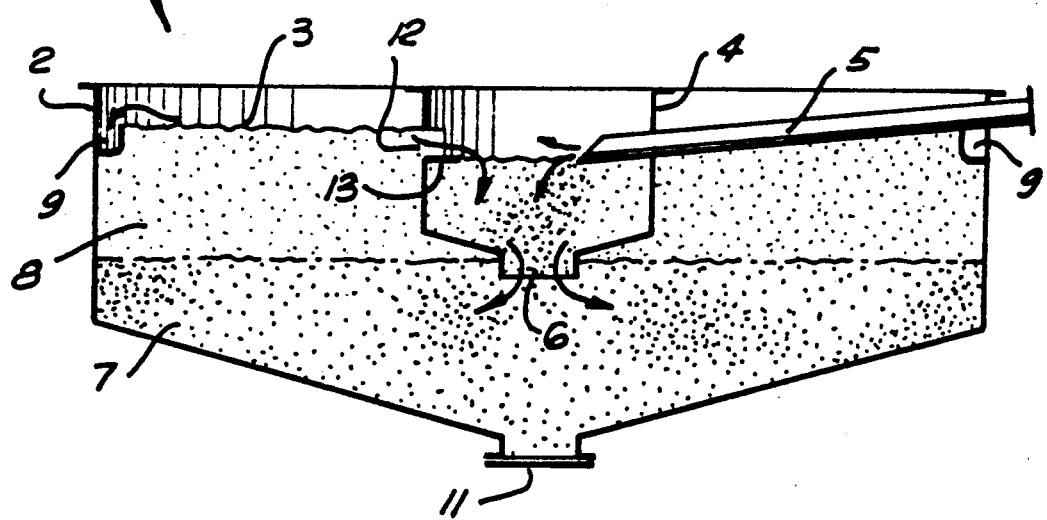
FIG. 2 is a side elevation of the thickener shown in FIG. 1.

Referring to the drawings, the thickener 1 includes a tank 2 for containing liquid pulp 3. The thickener 1 has a central feedwell 4 which is supplied via a feedline 5. In the embodiment of FIG. 1, the feedline 5 extends substantially tangentially with respect to the feedwell 4 so that feed liquid introduced through the feedline 5 will promote the mixing of the liquid in the feedwell 4. The feedwell 4 has a frusto-conical bottom portion with a bottom opening 6 in fluid communication with the tank, and through which liquid pulp in the feedwell can flow into the tank.

In normal operation, flocculation takes place in the thickener tank, whereby a bed of thickened pulp 7 settles to displace an upper layer of relatively dilute liquid 8 towards the top of the tank. The thickener tank is surrounded by an overflow launder 9 which channels excess overflow to a discharge pipe 10. The thickened pulp 7 is drawn off from below through the underflow withdrawal pipe 11.

The feedwell has transverse side slots 12 disposed above the bottom opening 6, and weir plates 13, pivotably connected to the feedwell adjacent the lower edges of the slots 12 such that the slots can be substantially closed by the weir plates. The weir plates 13 are selectively operable to establish fluid flow communication between the tank 2 and the feedwell 4 via the slots 12 to provide for dilution of the feed liquid in the feedwell by flow of dilute liquid from the tank to the feedwell.

Respective top and bottom plate segments 14 and 15 extend inwardly from the top and bottom edges of the slots to define respective top and bottom straight edges 16 and 17. Each weir plate is connected to a bottom plate segment 15 by a hinge 18 such that when in the closed position, the top edge of the weir plate abuts the top plate segment, substantially closing the slot. Each weir plate 13 has associated side plates 19 and 20 which slidingly and sealingly engage the side edges of each slot 12 such that as the weir plate is selectively and progressively raised from the horizontal open position, the flow of liquid between the tank and the feedwell through the slot is progressively restricted.

Each weir plate has floats 21 adjustably attached such that the position of the weir plate can be controlled by the height of liquid in the feedwell. In this way the difference in height between the liquid levels in the feedwell and the thickener tank, resulting from the difference in their specific gravities, can be utilised to cause relatively dilute liquid to flow from the surface of the thickener tank into the feedwell and automatically dilute the incoming pulp.

When the liquid level in the feedwell is below the level in the thickener (i.e. when the specific gravity of the material in feedwell is greater than the specific gravity of the liquid outside the feedwell), the floats will allow the weir plates to drop to a fully open position as shown in FIGS. 3 and 4. This permits the maximum ingress of liquid through the slots to dilute the incoming pulp.

When the pulp entering the feedwell is relatively dilute, there is only a small height difference between the liquid in the feedwell and the liquid in the tank. In this case the liquid in the feedwell causes the float to rise to a level such that the weir plate closes the slot so that substantially no liquid enters the feedwell from the tank, and no pulp flows from the feedwell to the tank through the slot.

The floats 21 in the hinged weir plates 13 may be adjusted by means of adjusting brackets 22 and adjusting bolts 23 such that the quantity of liquid entering the feedwell from the tank maintains a steady and relatively uniform dilution of the liquid in the feedwell.

In an alternative embodiment (not shown) a conduit means in the form of a perforate in-flow channel extends through the outer thickener tank and into the feedwell through an opening in the feedwell sidewall. In this embodiment, as inflowing feed liquid flows through the channels towards the feedwall, the dilute liquid near the surface of the thickener tank is permitted to enter the channel through the apertures or perforations and thereby progressively dilute the feed liquid within the channel, before it is discharged into the feedwell. In addition, the conduit or channel can include a venturi section to induce flow of the dilute liquid from the tank into the channel by means of a velocity induced pressure differential to provide for dilution of the feed liquid within the channel.

It will be apparent that this form of the invention can also be used in combination with the embodiment previously described.

This thickener provides a relatively cheap and efficient system for automatically recycling dilute liquor overflow from the thickenenr tank to dilute the pulp in the feedwell without the need for a complex system of valves, pumps and fluid lines.

Although the invention has been described with reference to specific examples, it will be appreciated by those skilled in the art that the invention may be embodied in many other forms. For example, the thickener need not include an adjustable weir plate, but may simply include one or more slots or openings in the feedwell side wall and located at appropriate predetermined positions to establish the flow of dilute liquor from the tank to the feedwell. In this case, the lower edge and hence the effective height of the side opening is defined by the edge of the feedwell side wall immediately adjacent and below the opening.

Alternatively a plate forming part of the feedwell side wall and defining the effective lower marginal edge of the side opening may be selectively adjustable between any one of a number of predetermined discrete positions to provide adjustment of the effective height of the side opening. These discrete positions may correspond to plate locating formations, such as a vertical array of bolt holes.

I claim:

1. A thickener for liquids or pulps comprising a tank in which flocculation takes place and dilute liquid is displaced toward the top of the tank, a feedwell having a bottom opening in fluid communication with the tank, a conduit for supplying a feed liquid to the feedwell, an aperture formed in the feedwell above the bottom opening and positioned for the flow of the dilute liquid directly from the tank into the feedwell for dilution of the feed liquid therein, and a weir plate mounted on the feedwell for movement between an open position for flow of dilute liquid from the tank into the feedwell and a closed position substantially closing the aperture.

2. A thickener according to claim 1 wherein the aperture comprises an opening in a side of the feedwell.

3. A thickener according to claim 2 wherein the weir plate has an upper edge that forms an effective lower edge of the aperture.

4. A thickener according to claim 3 wherein the weir plate is pivotally connected to the feedwell below the aperture and includes side panels in slidable sealing engagement with the feedwell.

5. A thickener according to claim 1 comprising weir plate adjusting means for adjusting the position of the weir plate means in response to variation in liquid level in the feedwell.

6. A method of thickening liquids or pulp in a tank in which flocculation takes place and dilute liquid is displaced toward the top of the tank comprising supplying a feed liquid via a conduit into a feedwall having a bottom opening in fluid communication with the tank and an aperture below an upper edge of the feedwell, and opening and closing the aperture by a weir plate mounted on the feedwell in accordance with the level of liquid in the feedwell to direct a selected flow of said dilute liquid through said aperture.

* * * * *